United States Patent [19]

Niemeyer, III

[11] Patent Number: 4,806,954
[45] Date of Patent: Feb. 21, 1989

[54] PEN CARRIAGE SUSPENSION FOR GRAPHIC RECORDER

[75] Inventor: Robert H. Niemeyer, III, Martinez, Calif.

[73] Assignee: AM International Corporation, Chicago, Ill.

[21] Appl. No.: 75,421

[22] Filed: Jul. 20, 1987

[51] Int. Cl.$^4$ ............................................. G01D 15/16
[52] U.S. Cl. .................. 346/139 R; 346/141
[58] Field of Search ........... 346/139 R, 139 B, 139 C, 346/29, 64, 141, 46, 49

[56] References Cited

U.S. PATENT DOCUMENTS 3,930,259  12/1975  Hoskins ........................... 346/139 R
4,500,890   2/1985  Nicholas ......................... 346/139 R

*Primary Examiner*—H. Broome
*Assistant Examiner*—Mark Reinhart
*Attorney, Agent, or Firm*—Roy A. Ekstrand; Nicholas A. Camasto

[57] ABSTRACT

A moveable pen carriage for use in a graphic recording system supports a plurality of recording pens in a linear array together with means for selectively engaging any one of the plurality of pens. Means are provided for imparting the desired motion to the pen carriage as well as the media upon which the recording is made. A pen carriage suspension system comprises a pair of wheel supports, each supporting a pair of grooved wheels which engage the upper and lower tracks within the pen carriage track system. Flexible members within the wheel supports provide resilient compensation for variations in track spacing while maintaining the correct angular position of the pen carriage.

13 Claims, 4 Drawing Sheets

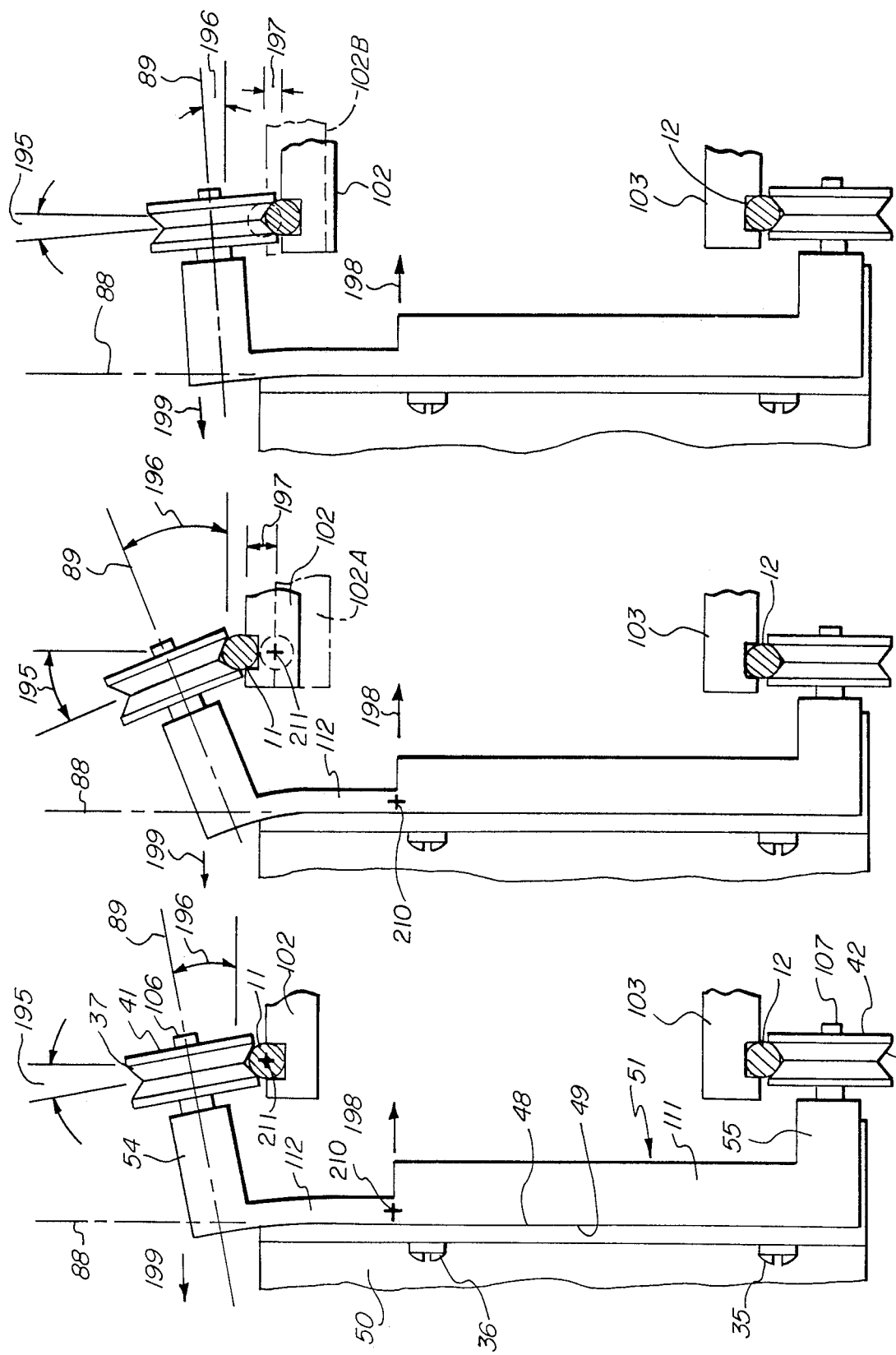

PEN CARRIAGE SUSPENSION FOR GRAPHIC RECORDER

CROSS REFERENCE TO RELATED APPLICATIONS

This application disclosed apparatus described and claimed in the following related application: ROTARY ACTION GRAPHIC RECORDING SYSTEM, filed 7-20-87 in the name of Robert Niemeyer, Ser. No. 07/075,533.

FIELD OF THE INVENTION

This invention relates generally to graphic recording systems and particularly to those in which a plurality of recording elements are carried by a moveable carriage and in which a recording media is moved relative to the path of carriage motion to provide a desired recording upon the media.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction and a moveable pen carriage which is supported and controlled to provide motion of the pen carriage in a second direction relative to the media motion. In most instances, the directions of media movement and pen carriage movement are orthogonal.

While a number of different graphic recording systems have been developed, generally, all comprise a rigid track structure supported above the media and aligned with the desired carriage path. The pen carriage supports a plurality of wheels or rollers configured to engage the track structure and facilitate the free motion of the pen carriage along the pen carriage path. A carriage drive system generally comprises one or more drive pulleys supporting a closed loop carriage band such that a portion of the carriage band is generally parallel to the track arrangement. A computer controlled motor drive system imparts precise motion to the carriage band. The pen carriage is coupled to the carriage band and is moved upon the track system in accordance with carriage band motion. The pen carriage must securely engage the track system and maintain a secure engagement while providing free motion along the carriage path. To meet these requirements, a number of carriage suspension systems have been developed. Generally, such systems provide a spring support system operative upon several of the carriage wheels to apply a predetermined securing force between the track structure and the carriage wheels or rollers. In other systems, the carriage is supported by rollers which fit within recessed grooves in the track structure and are captivated upon the track structure by the grooves.

In addition to the need to provide a secure engagement between the pen carriage and the track structure, it is also desirable to configure the pen carriage suspension system to accommodate the minor variations and irregularities found in even the most precise track structures. It is particularly important that the pen carriage maintain the appropriate angular relationship with the media to ensure that an accurate quality graphic recording image is produced. For example, angular changes or tilt of the pen carriage produces a corresponding tilt of the recording pen contact point with the media. Such tilt of the point of pen contact in turn produces image lines which are displaced from the intended position and may be crooked or waved or inconsistent in different directions.

Beyond the need for maintaining carriage angle, there arises a need to configure the carriage suspension system to respond quickly to minor track variations because of the carriage speed and the reciprocating character of carriage motion. At high speeds and reciprocating motion, uncompensated minor track variations produce a type of rattle in the carriage. This rattle can further degrade the quality of image produced upon the media.

There remains therefore, a need in the art for a system of pen carriage suspension for graphic recorders in which the pen carriage is securely engaged with the track structure and in which the appropriate captivating force is applied between the pen carriage and the track structure while providing free movement of the pen carriage upon the track. There is a further need for a pen carriage suspension system for graphic recorders which accommodates minor variations in the track structure while maintaining both the captivating force and the alignment of the pen carriage. There remains a further need for a system which responds quickly to the minor variation in the track structure to prevent carriage rattle.

SUMMARY OF THE INVENTION

Accordingly, it is a general object of the present invention to provide an improved graphic recording system. It is a more particular object of the present invention to provide an improved pen carriage suspension system for graphic recorders which accommodates minor track variations and maintains pen carriage alignment. It is a still more particular object of the present invention to provide a carriage suspension which is able to respond to the minor variations in the track at higher speeds of pen carriage movement to maintain the alignment of the pen carriage to the track under dynamic conditions.

In accordance with the invention there is provided pen carriage suspension means for use in supporting a pen carriage in rolling engagement with a pair of opposed spaced carriage tracks in a predetermined angular relationship with the tracks. The suspension means include a quartet of wheels configured to engage the pen carriage tracks; a pair of carriage supports rigidly coupled to the pen carriage at spaced-apart positions thereon, each defining a rigid wheel support supporting one of the wheels in rigid engagement with one of the pen carriage tracks and each defining moveable wheel supports supporting one of the wheels in flexible engagement with the other carriage track, in which the moveable wheel supports flex to accommodate spacing variations between the tracks without disturbing the angular relationship between the pen carriage and the pen carriage tracks.

BRIEF DESCRIPTION OF THE DRAWINGS

The features of the present invention, which are believed to be novel, are set forth with particularity in the appended claims. The invention, together with further objects and advantages thereof, may best be understood with reference to the following description taken in conjunction with the accompanying drawings, in the several figures of which like reference numerals identify like elements and in which:

FIGS. 4A, 4B and 4C show the wheel support of the present invention pen carriage suspension system in several suspension flex positions.

DESCRIPTION OF THE PREFERRED EMBODIMENTS

Figure 1:
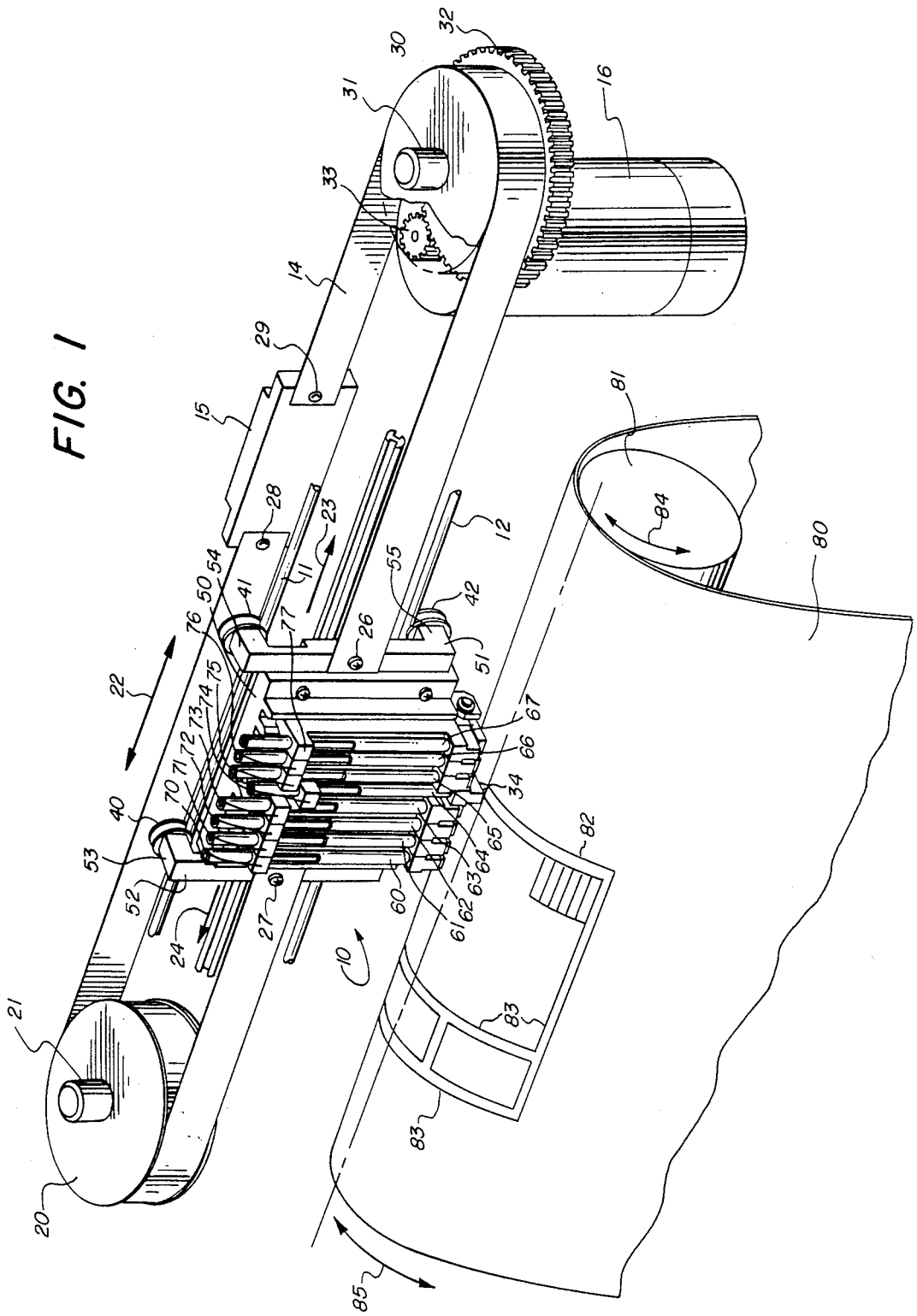
FIG. 1 is a perspective view of a graphic recording system utilizing the present invention pen carriage suspension.

FIG. 1 sets forth a perspective view of a rotary actuated graphic recording system having a pen carriage suspension system constructed in accordance with the present invention in which a moveable pen carriage, generally referenced by numeral 10, is secured to and controlled by a closed flexible carriage band 14. Carriage band 14 comprises a generally flat ribbon-like band of stainless steel. An upper track 11 and lower track 12 are supported parallel to the motion path of the forward portion of carriage band 14 by means set forth below in greater detail. It will be apparent, from examination of the figures below, that the details of the support structure of tracks 11 and 12 are omitted from FIG. 1 in order that the remainder of the system may be seen. Suffice it to state that the essential property of the structure supporting tracks 11 and 12 is the provision of a substantially rigid construction in which upper track 11 and lower track 12 support the weight of pen carriage 10 in a precise path while resisting the various forces imparted to the pen carriage, such as system vibrations.

Figure 3:
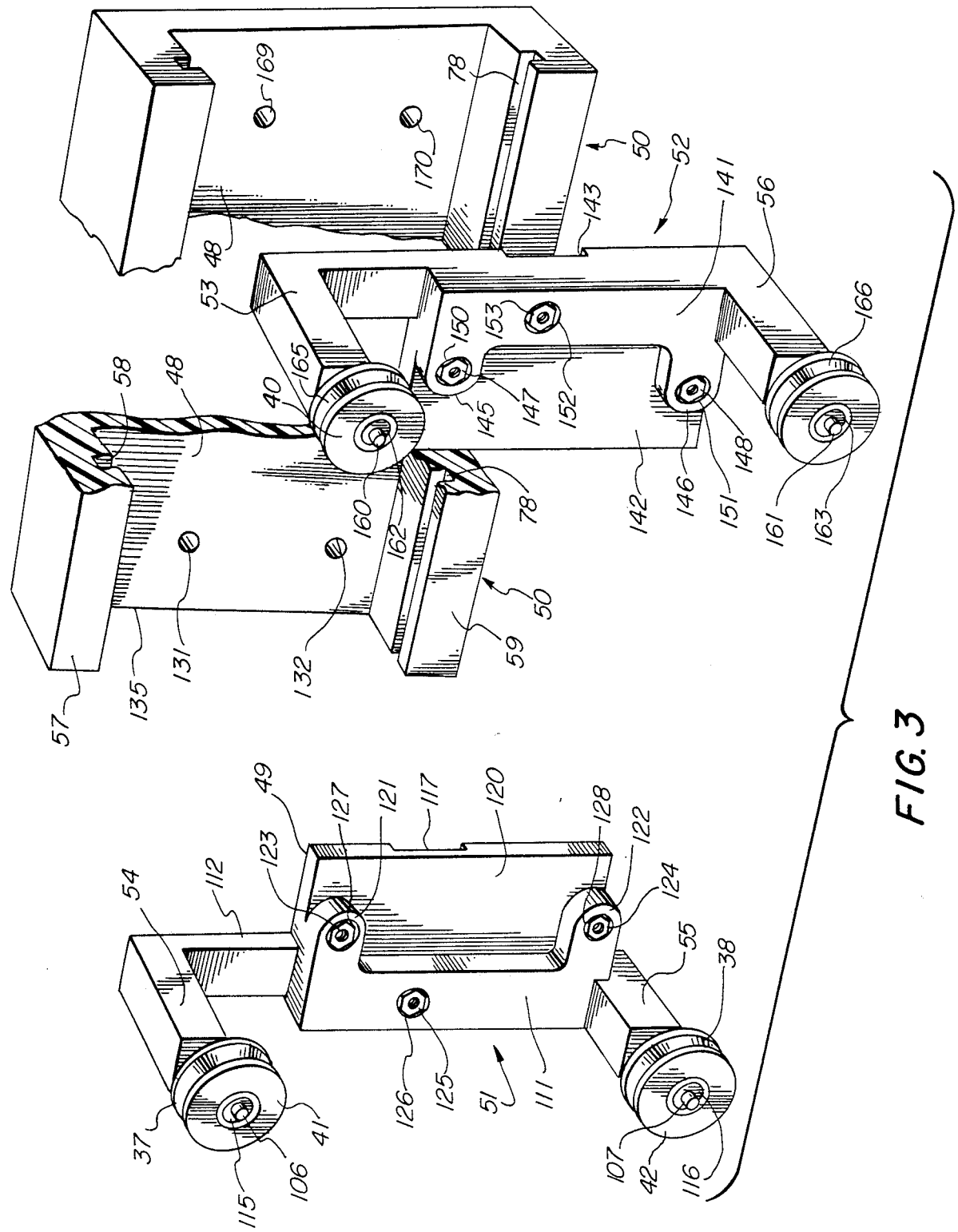
FIG. 3 is a perspective view of the wheel supports of the present invention pen carriage support system.

Pen carriage 10 includes a pen shuttle guide 50 and is formed of a lightweight, rigid plastic material. A pair of generally U-shaped wheel support members, preferrably formed of a lightweight, rigid plastic material 51 and 52, are secured to pen shuttle guide 50 by means set forth below in greater detail. The details of wheel supports 51 and 52 are also described below in greater detail. However, suffice it to note here that wheel support 51 terminates at one end in a rearwardly extending axle support 54 and at the other end in a similar axle support 55. Wheel support 52 (better seen in FIG. 3) is a mirror image of wheel support 51 and terminates at one end in a rearwardly extending axle support 53 and a rearwardly extending axle support 56 at the other end. A quartet of identical grooved wheels 40, 41, 42, and 43, the structures of which are better seen in FIG. 3, are rotatably secured to axle supports 53, 54, 55, and 56 respectively. As will be described below, wheels 40 through 43 are configured to receive and provide engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24.

Pen carriage 10 supports a plurality of generally elongated pen shuttles 70 through 77 which are moveably secured to pen shuttle guide 50 in a linear array. Pen shuttles 70 through 77 are generally perpendicular to the direction of travel of pen carriage 10 and support a corresponding plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised positions while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 as indicated by arrows 84 results in a corresponding linear motion of media 80.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counterweight 15. Except for the gap at counterweight 15, carriage band 14 comprises a continuous ribbon of material extending from fastener 28 around pulley 20 through pen carriage 10 and around drive pulley 30 to fastener 29. Pulley 20 comprises a free moving idler pulley while drive pulley 30 supports a ring gear 32. A carriage motor 16 comprises a bidirectional electric motor supporting a drive gear 33 which, in accordance with generally accepted principles of graphic recorder construction, is operatively coupled to the armature (not shown) of carriage motor 16. As a result, energizing carriage motor 16 rotates gear 33. Drive pulley 30 is supported with respect to gear 33 such that gear 33 engages gear 32 causing drive pulley 30 to rotate in response to the energizing of carriage motor 16. By means not shown, but in accordance with generally accepted fabrication techniques, carriage band 14 is maintained in tension to provide effective coupling of motion between drive pulley 30 and carriage band 14. Thus, rotation of drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. In accordance with the above-referenced related application, actuator beam 13 is operatively coupleable to selected ones of pen shuttles 70 through 77 to produce vertical motion of a selected one of pens 60 through 67.

In its general operation, electronic control means, which are not shown but which should be understood to be constructed in accordance with generally accepted graphic recording system techniques, are operative to energize motor 16. Carriage band 14 is driven by motor 16 moving pen carriage 10 back and forth to produce the desired motion of pen carriage 10 in either of two directions along the carriage travel path shown by arrows 23 and 24. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth in greater detail in the above-referenced related application, a selected pen shuttle such as pen 74 is moved in a downward direction by rotation of actuator beam 13 until pen point 34 of pen 64 contacts the surface of media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

Figure 2:
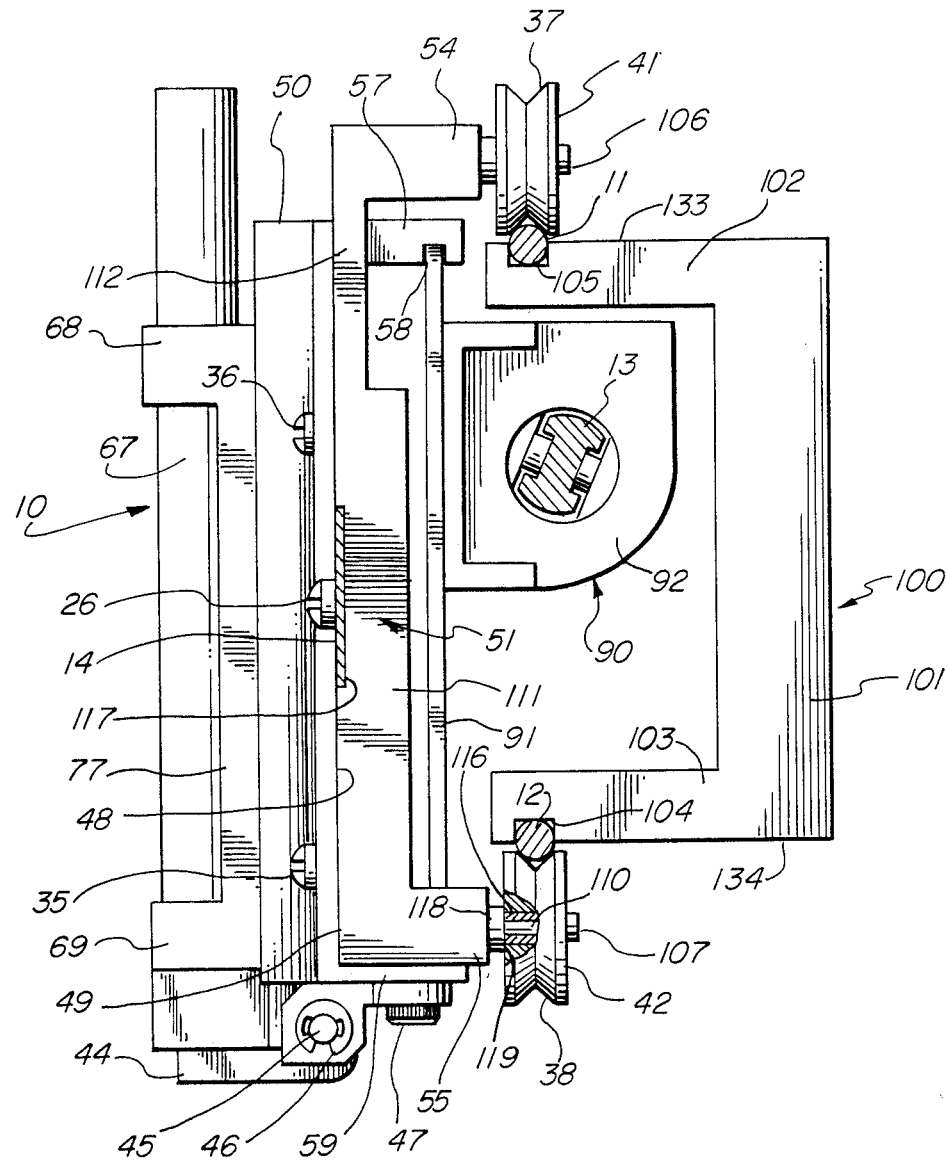
FIG. 2 is a right side view of the pen carriage of FIG. 1 together with the track supporting the pen carriage.

FIG. 2 sets forth a side view of pen carriage 10 supported by a track support 100 constructed in accordance with the present invention. In the figure shown, pen carriage 10 includes a pen shuttle guide 50 defining an upper extension 57 and a lower extension 59 (better seen in FIG. 3). Pen shuttle guide 50 further defines a planar surface 48 extending between extensions 57 and 59. Extension 57 defines a downwardly facing groove 58 while extension 59 defines an upwardly extending groove 78 (seen in FIG. 3). As mentioned above, and as is set forth in greater detail in the above-referenced related application, a plurality of pen shuttles, such as pen shuttle 77, is supported within pen shuttle guide 50. Pen shuttle 77 defines a pair of outwardly extending pen supports 68 and 69. A recording pen 67 having a generally cylindrical configuration, is received within pen supports 68 and 69 and is secured to pen shuttle 77. A flange member 46 is secured to the under side of extension 59 by a fastener 47 and supports a pin 45 which in turn supports a moveable pen cap door 44. As is also set forth in greater detail in the above-referenced related application, a vertical pen carriage drive 91 is supported within grooves 58 and 78 of extensions 57 and 59 respectively and is slideably moveable therein with respect to pen carriage 10. As is also set forth, a rotary drive 90 is supported by a support 92 and encircles actuator beam 13. Actuator beam 13 and rotary drive 90 cooperate to engage a selected one of the pens upon pen carriage 10 and move it into engagement with the recording media. The manner in which rotary drive 90 engages the selected pen and moves it into contact with the media is set forth in great detail in the above-referenced related application and need not be set forth herein. However, suffice it to note here that the operation of rotary drive 90 under the urging of rotation of actuator beam 13, drives the selected pen, such as pen 67, downwardly at an angle determined by the angular position of pen shuttle guide 50. In other words, the vertical angle of pen motion is for the most part, determined by the angle of support of pen shuttle guide 50.

Track support 100 is formed from an elongated channel member having the cross-sectional shape shown in FIG. 2 in which a rigid vertical member 101 supports a pair of inwardly extending rigid transverse members 102 and 103 to form a generally U-shaped channel member. Transverse member 102 defines an upwardly facing rectangular cross-sectioned groove 105 which receives upper track 11 in an interference or press fit such that the elongated cylindrical element comprising upper track 11 is captivated within groove 105 and extends above surface 133 of transverse member 102. Similarly, transverse member 103 defines a rectangular downwardly extending groove 104 which receives lower track 12 in an interference or press fit such that lower track 12 is captivated within groove 104 and extends above surface 134 of transverse member 103. In the preferred fabrication, upper track 11 and lower track 12 are formed of hardened steel and grooves 105 and 104 are precision machined grooves. By means not shown but which should be understood to include conventional mechanical fabrication, track support 100 is securely attached to the support structure of the graphic recorder such that upper track 11 and lower track 12 are supported above media 80 along the desired carriage path.

Wheel support 51 defines an elongated rigid beam portion 111 having a notch 117 and an inwardly extending axle support 55. Beam portion 111 and axle support 55 define a generally rectangular cross-section (better seen in FIG. 3). A flex portion 112 is continuous with beam portion 111 and extends upwardly therefrom. An axle support 54 having a rectangular cross-section similar to axle support 55, is continuous with flexible portion 112 and extends inwardly therefrom. As is better seen in FIG. 3, wheel support 51 further defines a planar surface 49 which abuts surface 48 of pen shuttle guide 50. Notch 117 receives carriage band 14 such that carriage band 14 passes between pen shuttle guide 50 and wheel support 51 as well as wheel support 52 (the latter seen in FIG. 1) without impairing the surface contact between surfaces 48 and 49. A fastener 26 extends through an aperture (not shown) in carriage band 14 and is threadably received within a threaded aperture (better seen in FIG. 3) of wheel support 51. A pair of fasteners 35 and 36 secure surface 49 of wheel support 51 to surface 48 of pen shuttle guide 50 by means described below in FIG. 3.

An axle 106 is supported by axle support 54 and extends inwardly therefrom. A grooved wheel 41 is received upon and secured to axle 106 and defines a V-groove 37. Similarly, an axle 107 is received within axle support 55 and supports grooved wheel 42 which in turn defines a V-groove 38 which receives a portion of the outer surface of lower track 12. Axles 106 and 107 are identical and define alignment shoulders which position wheels 41 and 42 with respect to surface 49. As is seen in the partial section of wheel 42, axle 107 defines an enlarged portion 118, a reduced portion 110 and an alignment shoulder 119. Wheel bearing 116 abuts shoulder 119 and is swaged to reduced portion 110. Grooved wheel 42 is similarly supported upon axle 106 such that V-grooves 37 and 38 are in a precise vertical alignment with respect to surface 49 of axle support 51.

In accordance with a further important aspect of the present invention set forth below in greater detail, the spacing between axles 106 and 107 is selected to ensure that V-grooves 37 and 38 of wheels 41 and 42 respectively captivate upper track 11 and lower track 12. The engagement maintains sufficient inward force to maintain V-grooves 37 and 38 respectively upon upper track 11 and lower track 12 which in turn maintains the engagement of pen carriage 10 with the track structure. As described below in greater detail, flex portion 112 provides a spring element within the suspension system which accommodates variations in the spacing between upper track 11 and lower track 12 while maintaining the inward force upon the track structure and ensure the engagement of grooved wheels 41 and 42 with the upper and lower tracks. As a result, pen carriage 10 is freely moveable along the pen carriage path by the rolling support of wheels 41 and 42 as well as wheels 40 and 43 of wheel support 52 (seen in FIG. 3).

It should be understood by reference to FIG. 1 that wheel support 52 is substantially identical in structure to wheel support 51 and supports wheels 40 and 43 in the same manner as wheel support 51 supports wheels 41 and 42 respectively. However, as is seen in FIG. 3, wheel support 52 is secured to the opposite end of pen shuttle guide 50 from which wheel support 51 is secured, and is therefore, the mirror image of wheel support 51.

FIG. 3 sets forth wheel supports 51 and 52 in perspective view together with a partially sectioned view of pen shuttle guide 50. In its preferred form, wheel support 51 is molded of a single piece of high strength plastic material and defines a rigid beam portion 111 having a pair of raised tabs 121 and 122 extending inwardly (to the right). A generally planar flange 120 is continuous with rigid beam portion 111 and extends beyond raised tabs 121 and 122. A flex portion 112 extends upwardly from rigid beam 111 and terminates in an axle support 54. A second axle support 55 is continuous with rigid beam 111 and extends outwardly from flange 120. Rigid beam 111 defines a recess 126 which receives a threaded nut 125. While not shown, it should be understood that rigid beam 111 further defines an aperture aligned with threaded nut 125 extending through rigid beam 111 and emerging at surface 49 of flange 120. Similarly, tabs 121 and 122 define a pair of recesses 127 and 128 respectively which in turn support threaded nuts 123 and 124 in the same manner as threaded nut 125. In further similarity, it will be understood that a corresponding pair of apertures (not shown) are aligned with threaded inserts 123 and 124 and extend through raised tabs 121 and 122 respectively as well as flange 120 and emerge at surface 49. As mentioned above, surface 49 defines a transversely extending notch 117 which accommodates carriage band 14 as shown in FIG. 2. Axles 106 and 107 are supported by axle supports 54 and 55 respectively. Grooved wheels 41 and 42 include bearings 115 and 116 respectively and are supported thereby upon axles 106 and 107 respectively. As mentioned above, the positions of bearings 115 and 116 upon axles 106 and 107 respectively, are selected to align wheels 41 and 42 precisely.

As is also mentioned above, pen shuttle guide 50 defines a pair of extensions 57 and 59 which in turn define a pair of inwardly extending grooves 58 and 78 respectively. Pen shuttle guide 50 further defines a surface 48 between extensions 57 and 59 and a pair of apertures 131 and 132. Wheel support 51 is assembled to pen shuttle guide 50 by placing surface 49 in contact with surface 48 of pen shuttle guide 50 and aligning apertures 131 and 132 with threaded inserts 123 and 124 respectively. Thereafter, fasteners 36 and 35 (seen in FIG. 2) are passed through apertures 131 and 132 respectively and threadably received within threaded inserts 123 and 124 respectively. In accordance with an important aspect of the present invention, the assembly of wheel support 51 to pen shuttle guide 50 positions flexible portion 112 beyond or outside of edge 35 of the pen shuttle guide. Accordingly, flex portion 112 is offset from pen shuttle guide 50 which permits flex portion 112 to flex with respect to the pen shuttle guide as described below.

Wheel support 52, which is in essence a mirror image of wheel support 51, defines a rigid beam 141 terminating at one end in an axle support 56 and defining a pair of inwardly extending raised tabs 145 and 146. Wheel support 52 further defines a generally planar flange 142 continuous with rigid beam portion 141, axle support 56 and raised tabs 145 and 146. Rigid beam portion 141 defines a recess 152 which receives a threaded insert 153. Raised tabs 145 and 146 define recesses 150 and 151 respectively which in turn receive threaded inserts 147 and 148 respectively. Flange 142 defines a transverse notch 143 configured to receive carriage band 14. Rigid beam portion 141 further defines an upwardly extending flex portion 140 which in turn supports an axle support 53. A pair of axles 160 and 161, which are similar to axles 106 and 107, are supported by axle supports 53 and 56 respectively and a pair of grooved wheels 40 and 43 support a pair of wheel bearings 162 and 163 respectively which are received by axles 160 and 161 respectively in the same manner as bearing 116 is received upon axle 107. Wheel support 52 is secured to pen shuttle guide 50 in a similar manner to that set forth for wheel support 51 in that surface 144 is placed against surface 48 of pen shuttle guide 50 and apertures 169 and 170 thereof are aligned with threaded nuts 147 and 148 respectively. Thereafter, a similar pair of fasteners to fasteners 36 and 35 (seen in FIG. 2) extend through apertures 169 and 170 and are threaded into nuts 147 and 148 to secure wheel support 52 to the pen shuttle guide. As described above for wheel support 51, wheel support 52 is positioned with respect to pen shuttle guide 50 such that flex portion 140 is offset and free to move with respect to the pen shuttle guide.

FIGS. 4A, 4B and 4C set forth the response of the present invention pen carriage suspension system to variations of the spacing between upper track 11 and lower track 12. It should be noted that in FIGS. 4A, 4B and 4C, the intent is to illustrate the comparative flexing actions of the present invention pen carriage suspension system. In order to facilitate the understanding of the self compensating function of the system, the track spacing variations and resulting positional and angular changes of the suspension system are exaggerated in order to be readily seen by the reader. Toward that end, FIG. 4A depicts the normal position of the system in accordance with the normal spacing between upper track 11 and lower track 12. FIG. 4B on the other hand, illustrates the relative position of the suspension system components in the event the spacing between upper track 11 and lower track 12 increases from the norm. Conversely, FIG. 4C sets forth the compensating action of the present invention pen carriage suspension system in response to a reduction in the spacing between upper track 11 and lower track 12.

With respect of FIG. 4A, wheel support 51 is shown positioned in accordance with the foregoing assembly in which pen shuttle guide 50 (shown partially sectioned) defines reference surface 48 and supports a pair of fasteners 35 and 36. Wheel support 51, as described above, comprises a rigid beam member 111, a flex portion 112 and a pair of axle supports 54 and 55. Axle support 54 supports an axle 106 which in turn supports a grooved wheel 41 which defines a V-groove 37. Similarly, axle support 55 supports an axle 107 which in turn supports a grooved wheel 42 defining a V-grooved 38. A transverse member 103 supports a lower track 12 while a transverse portion 102 supports an upper track 11. In accordance with the invention, upper track 11 is received within V-groove 37 of wheel 41 and lower track 12 is received within V-groove 38 of grooved wheel 42. As mentioned, FIG. 4A depicts the normal spacing between upper track 11 and lower track 12. Accordingly, wheel support 51 is sized such that the spacing between upper track 11 and lower track 12 is slightly greater than the spacing between V-grooves 37 and 38 of wheels 41 and 42 respectively, which results when flex portion 112 is straight or unflexed. As a result, the positioning of pen carriage 10 upon upper tracks 11 and 12 requires spreading wheels 41 and 42 slightly to accommodate the greater spacing between upper track 11 and lower track 12. With a spreading of wheels 41 and 42, flex portion 112 is caused to bend in the direction shown in FIG. 4A which results in moving axle support 54 slightly beyond reference plane 88. Concurrently, the spreading of wheels 41 and 42 results in inclining the major axis 89 of axle 106 and axle support 54 away from the normal horizontal axis to produce an angular tilt or incline indicated by angle 196. Correspondingly, the inclination of axle 106 inclines wheel 41 in accordance with angle 195. In accordance with an important aspect of the present invention, the inclination of axle support 54 caused by the spacing of upper track 11 and lower track 12 produces curvature of flex portion 12 together with the leftward motion indicated by arrow 199 of axle support 54. In accordance with an important aspect of the present invention, flex portion 112 bends about a pivot point to accommodate the track spacing and assumes the curvature shown in FIG. 4A which in turn causes a movement to the right of the upper portion of rigid beam 111 indicated by arrow 98. The resiliency or spring constant of flex portion 112 is selected such that the leftward movement of axle support 54, indicated by arrow 199, and the rightward movement of the upper portion of rigid beam member 111, indicated by arrow 198, are equal. As a result, the angular position of reference surface 49 of wheel support 51 remains unchanged despite the relative motion of axle support 54 and the inclination of wheel 41. It has been determined that the systems ability to compensate for track variations is optimized if an angle of forty-five degrees exists between a line joining pivot point 210 and the center point 211 corresponding to the position of track 11 with respect to groove 37 of wheel 41 and spring member 112 prior to installation of pen carriage 10 upon tracks 11 and 12.

FIG. 4B shows the response of the present invention suspension system to an increase in the spacing between upper track 11 and lower track 12. In the situation shown, transverse member 102 has been displaced upwardly with respect to transverse member 103 from its previous position shown in dashed line 102A to the solid line position shown. The upward increment of spacing change is shown as distance 197. With the increased spacing between upper track 11 and lower track 12, the degree of bending of flex portion 112 is dramatically increased to accommodate the track spacing change. As a result, the inclination of axle support 54 and axle 106, shown as angle 196, is substantially increased, as is the angle of inclination 195 of wheel 41. It should be noted however, that despite the increase in wheel inclination, upper track 11 nonetheless remains captivated within groove 37. With the increased bending of flex portion 112, the displacement of axle support 54 to the left, shown by arrow 199, is increased and extends beyond reference plane 88 a substantially greater distance than previously shown in FIG. 4A. However, in accordance with the present invention system, an equal and opposite displacement is imparted to the upper portion of rigid beam member 111 as shown in the direction of arrow 198. Accordingly, with the displacements of axle support 54 and the upper portion of rigid beam 111 being in opposite directions, a compensation for the displacement of axle support 54 results and wheel surfaces 48 and 49 remain in alignment with reference plane 88.

FIG. 4C sets forth the response of the present invention pen carriage suspension system to a reduction in the spacing between upper track 11 and lower track 12. Accordingly, transverse member 102 is displaced from the position shown in FIG. 4A indicated by dashed line 102B to a position closer to transverse member 103. The distance increment by which transverse member 102 has moved is indicated by displacement 197. With the reduction of spacing between upper track 11 and lower track 12, the degree of bending of flex portion 112 is decreased as is the inclination of axis 89 of axle 106 as well as the angle of inclination 195 of wheel 41. With a reduced inclination of angle 196, axle support 54 is displaced in the direction indicated by arrow 199 a lesser distance than its displacement shown in FIG. 4A. Correspondingly, the degree of bending of flex portion 112 is reduced which in turn reduces the displacement of the upper portion of rigid beam 111 in the direction shown by arrow 198. As a result, surface 48 and 49 remain in appropriate alignment with reference plane 88 and the angular position of pen carriage 10 remains consistent.

While the foregoing descriptions in FIGS. 4A, 4B and 4C describe the operation of wheel support 51, it should be apparent to those skilled in the art that a similar reaction takes place on the part of wheel support 52. Thus, wheel supports 51 and 52 cooperating and responding in the manner shown in FIGS. 4A, 4B and 4C provides adjustment of the suspension system to variations in the spacing between upper track 11 and lower track 12. It should be noted that the normal or center position shown in FIG. 4A is selected to provide a range of compensating movement while maintaining a sufficient securing force between wheels 41 and 42 and upper track 11 and lower track 12 respectively, to assure the engagement of pen carriage 10 and the track system.

What has been shown is a pen carriage suspension system for a graphic recorder which maintains the pen carriage in secure engagement with the track structure by applying a sufficient captivating force while accommodating variations in the track structure without disturbing the angular position of the pen carriage.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a graphic recording system having a track support including a pair of spaced tracks and a pen carriage having a rigid body supporting at least one pen, pen carriage suspension means supporting said pen carriage in moveable engagement with said spaced tracks, said pen carriage suspension means comprising:

a first wheel support defining a first rigid portion, a first axle support rigidly extending from said first rigid portion, a second axle support, and a first flex portion flexibly coupling said second axle support to said first rigid portion such that said second axle support is aligned with said first axle support;

first and second axles coupled to said first and second axle supports respectively;

a second wheel support defining a second rigid portion, a third axle support rigidly extending from said second rigid portion, a fourth axle support, and a second flex portion flexibly coupling said fourth axle support to said second rigid portion such that said fourth axle support is aligned with said third axle support;

third and fourth axles coupled to said third and fourth axle supports respectively;

first and second wheels having first and second respective bearings supporting said first and second wheels upon said first and second axles respectively;

third and fourth wheels having third and fourth respective bearing means supporting said third and fourth wheels upon said third and fourth axles respectively; and attachment means rigidly securing said first and second wheel supports to said rigid body such that said first, second, third and fourth wheels rollingly engage said spaced pair of tracks, said first and second flex portions bending to accommodate variations in the spacings between said spaced pair of tracks while maintaining the angular position of said pen carriage.

2. Pen carriage suspension means as set forth in claim 1 wherein said rigid body defines first and second receiving surfaces and wherein said first and second wheel supports define respective third and fourth reference surfaces having a predetermined alignment with said first and second and said third and fourth wheels respectively and wherein said first and second reference surfaces are received upon and maintained in contact with said first and second receiving surfaces respectively.

3. Pen carriage suspension means as set forth in claim 2 wherein;

said first rigid portion defines a first elongated member having first and second ends and wherein;

said first axle support extends from said first end of said first rigid portion and wherein said first flex portion defines an elongated flexible member having a first end coupled to said second end of said first rigid portion and a second end coupled to said second axle support and wherein;

said second rigid portion defines a second elongated member having third and fourth ends and wherein; and said third axle support extends from said third end of said second rigid portion and wherein said second flex portion defines a second elongated flexible member having a third end coupled to said fourth end of said second rigid portion and a fourth end coupled to said fourth axle support.

4. Pen carriage suspension means as set forth in claim 2 wherein said tracks within said spaced pair of tracks define elongated outwardly extending convex surfaces and wherein said first, second, third and fourth wheels define inwardly extending circumferential grooves configured and sized to receive and engage said elongated convex surfaces.

5. Pen carriage suspension means as set forth in claim 4 wherein aid first and second wheels are positioned outside of said spaced pair of tracks and said first flex portion provides a residual spring force captivating said spaced tracks between said first and second wheels and wherein said third and fourth wheels are positioned outside of said spaced pair of tracks and said second flex portion provides a residual spring force captivating said spaced tracks between said third and fourth wheels.

6. Pen carriage suspension means as set forth in claim 5 wherein said pen carriage supports a linear array of recording pens and wherein said pair of tracks are aligned in a common vertical plane and wherein said receiving surfaces are parallel to the vertical alignment of said pair of tracks.

7. Pen carriage suspension means as set forth in claim 6 wherein said first and second wheel supports are each formed of integral one piece molded plastic members.

8. Pen carriage suspension means as set forth in claim 7 wherein said first, second, third and fourth axles each define respective reference shoulders and wherein said first, second, said respective reference surfaces of said first, second, third and fourth axles and are secured thereto by swaging a portion of said wheel bearings against said axles.

9. For use in supporting a pen carriage in rolling engagement with a pair of opposed spaced carriage tracks in a predetermined angular relationship with the tracks, pen carriage suspension means comprising:

a quartet of wheels configured to engage the pen carriage tracks;

a pair of carriage supports rigidly coupled to the pen carriage at spaced-apart positions thereon, each defining a rigid wheel support supporting one of said wheels in rigid engagement with one of the pen carriage tracks and each defining moveable wheel supports supporting one of said wheels in flexible engagement with the other carriage track, said moveable wheel supports flexing to accommodate spacing variations between the tracks without disturbing the angular relationship between the pen carriage and the pen carriage tracks.

10. Pen carriage suspension means as set forth in claim 9 wherein said moveable wheel supports each include an elongated flexible beam portion interposed between said moveable wheel supports and said rigid wheel supports.

11. Flexible pen carriage suspension means for supporting a pen carriage comprising:

a rigid pen carriage body defining first and second spaced apart coplanar receiving surfaces;

a first wheel support defining a first generally planar member having a first reference surface and a first outer edge, a first elongated rigid beam member aligned with said first outer edge and having a first and a second end, a first lower axle support rigidly joined to said first end of said first rigid beam member and extending orthogonally therefrom, a first elongated flexible beam portion having a first end joined to said second end of said first rigid beam and a second end, a second axle support joined to said second end of said first flexible beam and extending substantially orthogonally therefrom in the same direction as said first axle support extends;

a first pair of axles extending from said first and second axle supports;

a first pair of axles each having wheel bearings positioned upon said first pair of axles;

a second wheel support defining a second generally planar member having a second reference surface and a second outer edge, a second elongated rigid beam member aligned with said second outer edge and having a third and a fourth end, a second lower axle support rigidly joined to said third end of said second rigid beam member and extending orthogonally therefrom, a second elongated flexible beam portion having a third end joined to said third end of said second rigid beam and a fourth end, a fourth axle support joined to said fourth end of said second flexible beam and extending substantially orthogonally therefrom in the same direction as said third axle support extends;

a second pair of axles extending from said third and fourth axle supports;

a second pair of wheels each having wheel bearings positioned upon said second pair of axles; and means securing said first and second wheel supports to said carriage body such that said first and second reference surfaces bear upon said first and second receiving surfaces and said first and second flexible beams extend in a common direction and said first and second pairs of wheels are coplanar.

12. Flexible pen carriage suspension means as set forth in claim 11 wherein said first, second, third and fourth wheels engage a pair of elongated parallel tracks and wherein said first and second flexible beams are normally straight and bend to curved shapes when the wheels within their respective pairs of wheels are forced apart and wherein the curvature assumed by said first and second flexible beams causes said carriage body to maintain a constant angular alignment with respect to the plane defined by said tracks despite the spreading of said wheels.

13. Flexible pen carriage suspension means as set forth in claim 12 wherein the spring characteristics of said first and second flexible beams are selected to permit said first and second flexible beams to bend with sufficient speed to respond to track variations at increased carriage speeds.

* * * * *